Patented Mar. 5, 1935

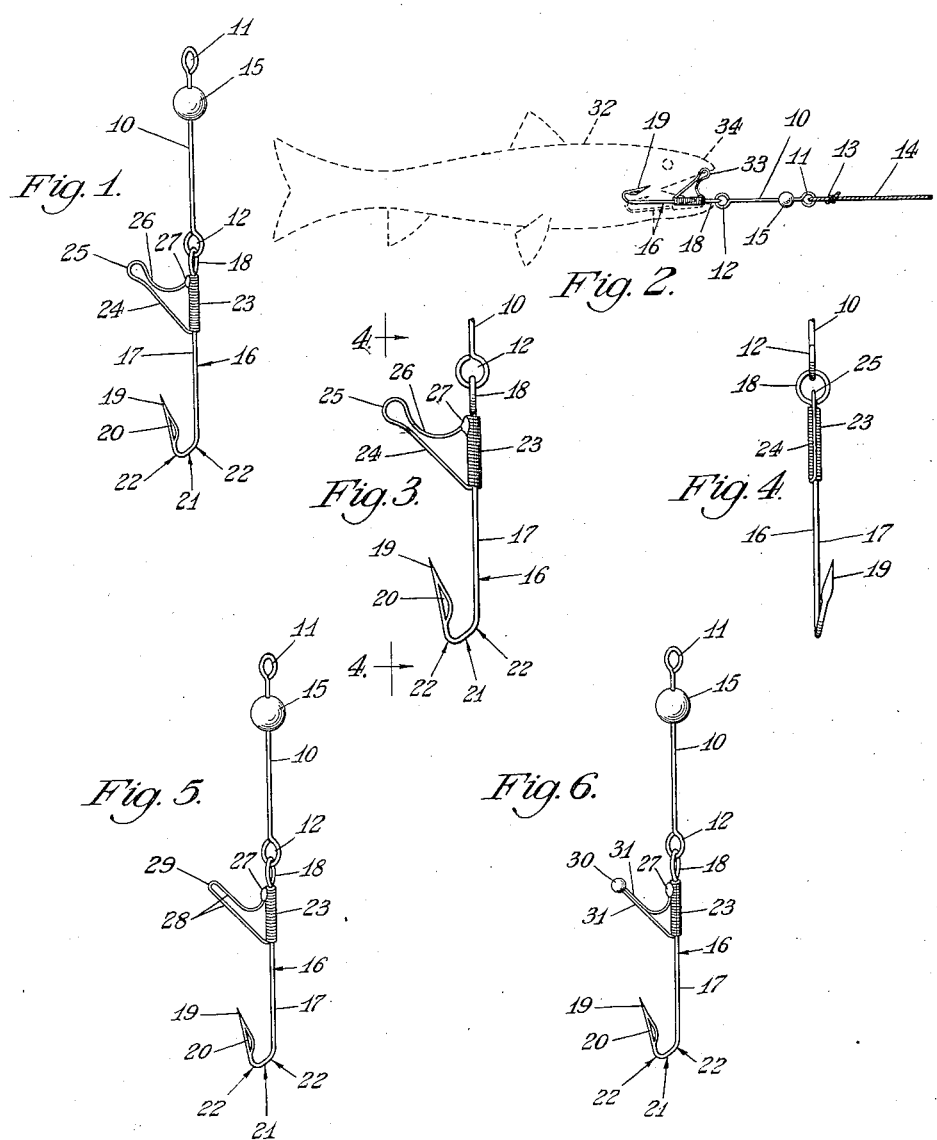

1,992,969

UNITED STATES PATENT OFFICE 1,992,969

MINNOW HOOK

Frank Soukup, Spillville, Iowa

Application June 2, 1933, Serial No. 674,073

4 Claims. (Cl. 43—40)

This invention relates to minnow hooks, and has for its principal object the provision of an improved construction of this character which will be highly efficient in use and economical in manufacture.

At the present time there are many state statutes which prohibit the taking from water of minnows for bait by means of nets or like devices, and as a consequence in such instances the usual practice is the employment of a minnow hook for this purpose. Where a minnow hook is employed for this purpose, it is essentially necessary that such hook be of a construction and design which will not be injurious to the minnows when taken from the water by means of hooks. It is, therefore, one of the many objects of this invention to provide a minnow hook which will accomplish this purpose.

Minnows employed for bait are known to be of a delicate character and the employment of a hook which requires excessive pulling and twisting obviously will rupture the body portion of the minnow in the region where hooked and consequently the extraction of the hook tears or ruptures the body portion of the minnow in most instances to the extent that the minnow survives but a very short period after being removed from the hook.

It is one of the objects of this invention to provide a minnow hook having a combined guard and rocker arm which will function to prevent the minnow from excessively swallowing the hook and to locate the hook so that the same will come into contact with that portion of the minnow's body which is of a tissue structure substantially bloodless, whereby when the hook is removed from that portion of the body the minnow's body is neither ruptured nor pierced as to bring about expiration by bleeding.

In the drawing:

Fig. 1 is an enlarged perspective view of my invention;

Fig. 2 is a side view of the same showing substantially its actual size and in application with reference to a minnow;

Fig. 3 is a fragmentary enlarged view of the hook proper embodying my invention;

Fig. 4 is an edge view of the same;

Fig. 5 is an enlarged view of my invention showing a slightly modified form of construction over that illustrated in Fig. 1; and Fig. 6 is an enlarged view of my invention showing a further modified form of construction over that shown in Figs. 1 and 5.

Referring particularly to Figs. 1 to 4 inclusive, my improved minnow hook includes a link 10, the opposite ends of which are bent to provide eyelets 11 and 12, the eyelet 11 being adapted for connection as at 13 to the line 14. On the shank 10 is frictionally mounted a sinker 15 of any approved type but preferably of a weight which will submerge the hook in the water without disturbance.

The hook proper is indicated at 16 and includes a shank 17 having an eyelet 18 at one end thereof for connection with the eyelet 12 as shown in Figures 1 to 4 inclusive. Formed as an integral part of the shank 17 is a hook portion having an enlargement at its free end and which terminates in a point 19. The hook portion extends at a slight inclination with respect to the longitudinal axis of the shank 10 and the enlarged portion is provided with a curved inner side and slotted as at 20, thereby providing what may be termed a ventilated barbless hook, or in other words a hook without the usual barb, so as to prevent serious injury to the minnow as well as expeditious extraction of the hook therefrom, and yet prevent casual removal of the hook.

The interconnecting section between the shank 17 and the slotted enlarged portion is formed with a substantially straight inclined portion 21 having slightly rounded ends 22 substantially merging into the enlarged portion and the shank 16, as clearly shown in the drawing.

Preferably adjacent the eyelet 18 upon the shank 17 is a coiled section 23 of a combined guard and rocker arm 24, the arm 24 being provided by bending a section of the wire forming the coil to a plane which will be substantially at an inclination with respect to the longitudinal axis of the shank 17 and forming at the outer end thereof a round loop 25 with the opposite end of the wire member concaved as at 26 and connected to the coil as at 27 by means of solder or other suitable connecting material.

In Fig. 5 the minnow hook illustrated therein is constructed substantially the same as that shown in Figs. 1 to 4 inclusive, with the exception that the combined guard and rocker arm is provided by two parallel strands 28 bent to provide a substantially round extremity as at 29.

In Fig. 6 the minnow hook is likewise constructed substantially the same as that shown in Figs. 1 to 4 inclusive, with the exception that in this instance instead of providing the rounded extremity of the wire member, a small pellet 30 is secured to the parallel strands 31 in any suitable manner.

In Fig. 2 I have illustrated substantially the actual size of my minnow hook and have shown the same in application with reference to a minnow 32. As shown, the hook portion is disposed at a point within the mouth of the minnow so as to dispose the rocker point indicated at 33 of the combined guard and rocker arm directly beneath the upper lip 34 of the minnow. In this position when the line 14 is made taut, the longitudinal exertion upon the hook proper indicated at 16 will bear the rocker point 33 against the lip 34 and consequently rock or move the barbed point 19 in a direction opposite to hook-engaging position so that as soon as the rocker point 33 is disengaged from the lip 34, the barbed point 19 will be disposed in a position to hook the lip of the minnow instead of that portion of the body which would be injurious to the life of the minnow. The flat section 21 of the hook cooperates with the guard arm to prevent the hook portion from digging into the fleshy portion of the minnow's body and also allows the point 19 of the hook to slide freely until the rocker point 33 is disengaged as hereinbefore explained.

It will be noted that the rocker point is disposed upon a line which is substantially tangent to the longitudinal axis of the shank 17 of the hook. This is preferably for the reason that in extracting the rocker point 33 from contact with the lip, there will be sufficient room for the point 19 to rock without becoming hooked with adjacent fleshy portions of the minnow.

It is apparent that the minnow cannot become hooked other than through the mouth thereof, and this results by virtue of the combination guard and rocker arm, the function of which has been previously explained.

I claim:

1. The combination with a fish hook including a shank portion, of an arm having one end fastened to the shank and arranged at an acute angle to the latter, with the outer end of the arm pointing away from the hook portion.

2. The combination with a fish hook including a shank portion, of an arm having one end fastened to the shank and arranged at an acute angle to the latter, with the outer end of the arm pointing away from the hook portion, said arm comprising a piece of wire bent to provide two reaches.

3. The combination with a fish hook including a shank portion, of an arm projecting from said shank, said arm being arranged at an acute angle to the shank, with its outer end pointing away from the hook portion, said arm comprising a piece of wire having one end coiled about the shank, to provide a weight.

4. A minnow hook comprising a shank, a barbless hook portion formed on one end of the shank and terminating in a point, means secured to the shank and arranged at an acute angle thereto and upwardly and outwardly therefrom for cooperation with the hook portion to direct the point to the mouth of a minnow, and said hook portion including means to prevent casual removal thereof from the minnow.

FRANK SOUKUP.